Figure 1:
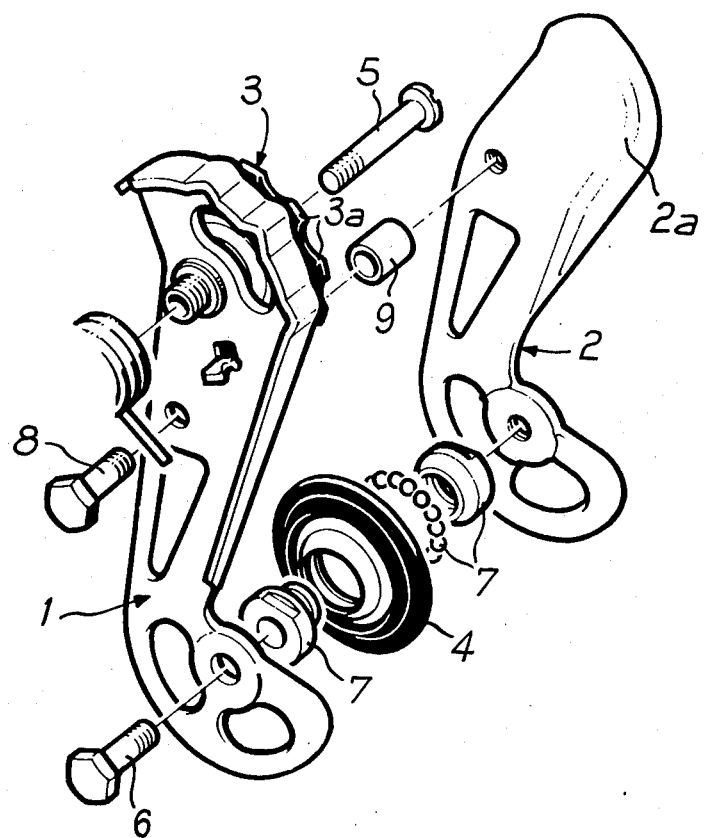

United States Patent [19]

Huret et al.

[11] 4,058,020
[45] Nov. 15, 1977

[54] DEVICE FOR GUIDING THE CHAIN OF DERAILLEUR BICYCLE GEAR CHANGERS

[76] Inventors: Roger Huret; Jacques Huret, both of 60, avenue Felix Faure, 92000 Nanterre, France

[21] Appl. No.: 735,317

[22] Filed: Oct. 26, 1976

Related U.S. Application Data

[63] Continuation of Ser. No. 539,852, Jan. 9, 1975, abandoned.

[30] Foreign Application Priority Data

Jan. 30, 1974 France .................. 74.03142

[51] Int. Cl.² ............................. F16H 7/22
[52] U.S. Cl. .................. 74/217 B; 74/241; 74/242
[58] Field of Search ............ 74/217 B, 242, 242.11 B, 74/242.14 B, 242.15 B, 241

[56] References Cited

U.S. PATENT DOCUMENTS 3,847,028  11/1974  Bergles .................. 74/217 B
3,960,025  6/1976   Juy ...................... 74/217 B
3,994,167  11/1976  Juy ...................... 74/217 B

FOREIGN PATENT DOCUMENTS 900,305  7/1949  Germany .................. 74/217 B
918,313  9/1954  Germany .................. 74/217 B Primary Examiner—Samuel Scott
Assistant Examiner—Allan R. Burke
Attorney, Agent, or Firm—Lewis H. Eslinger

[57] ABSTRACT

A bicycle derailleur gear changer has a device for guiding the chain and the device has chain-guiding and chain-adjusting pulleys which are mounted between the ends of two cheek plates. The device is movable to effect gear changes by transferring the chain from one to another of sprockets attached to the hub of the bicycle rear wheel. The cheek plates are specially shaped with radial extensions adjacent the chain-guiding pulley, the extensions terminating in turned over edges facing away from the pulley to prevent possible jamming of the gear changer when the chain is driven in the reverse direction.

15 Claims, 7 Drawing Figures

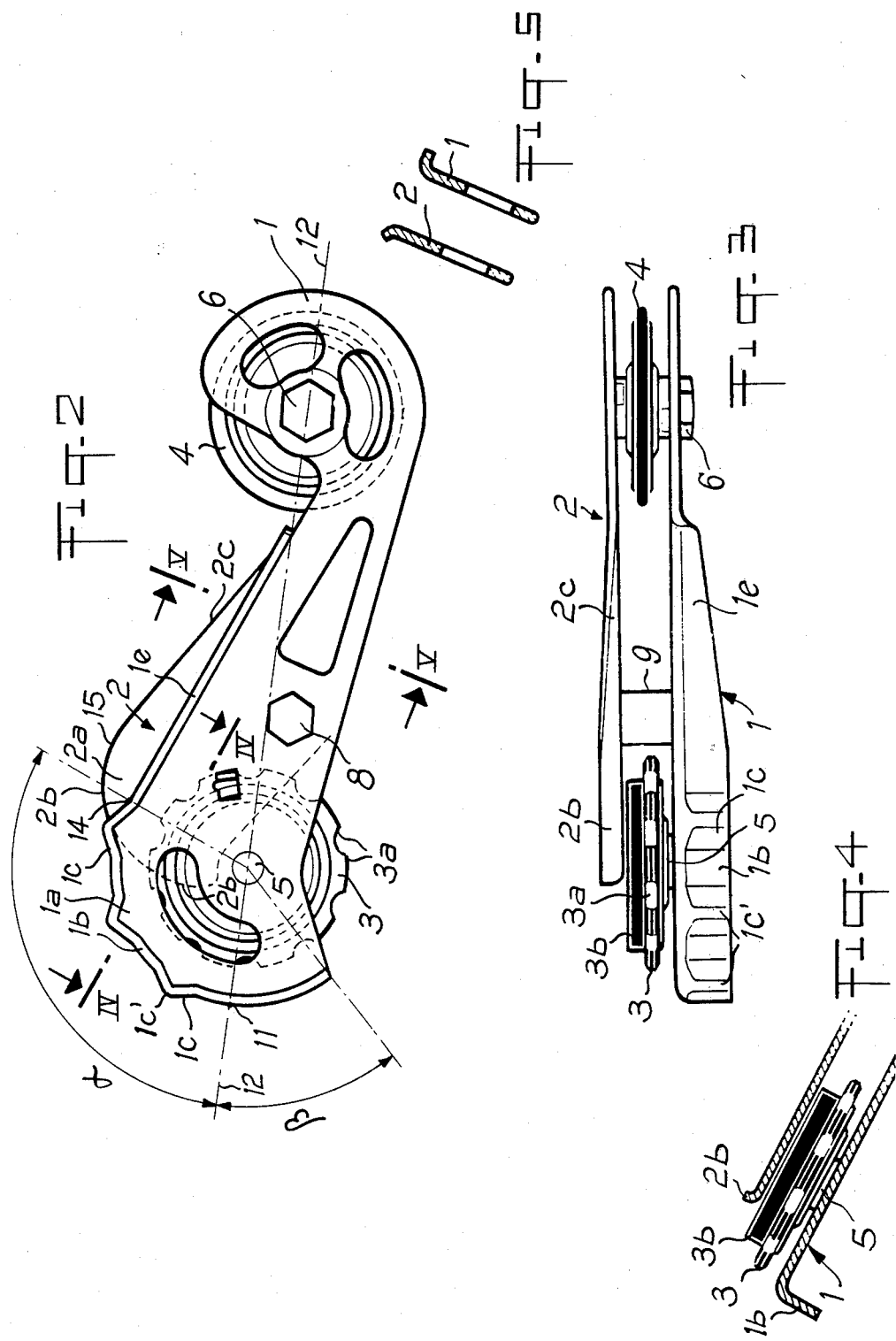

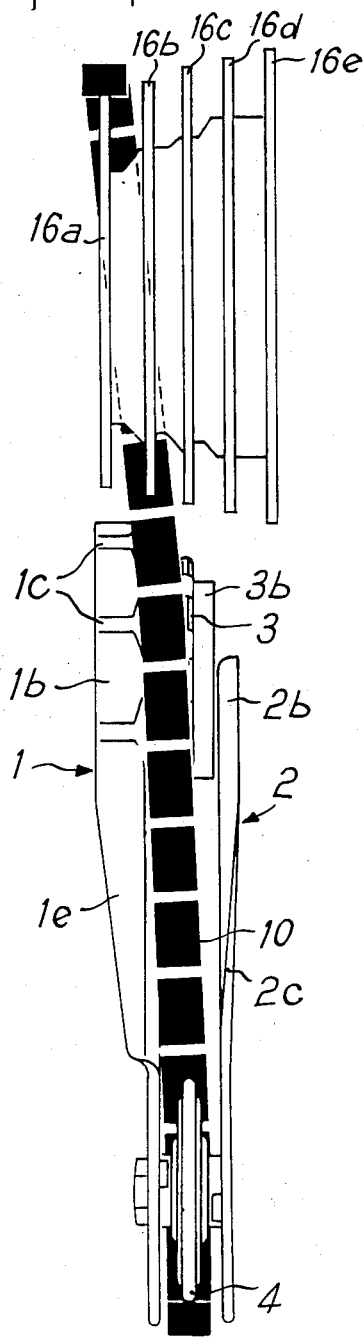
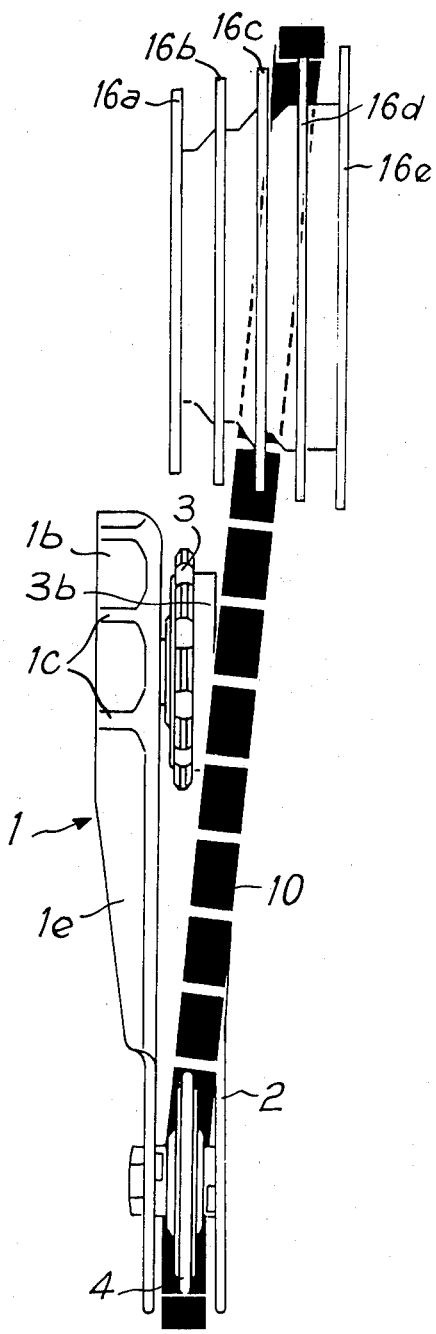

DEVICE FOR GUIDING THE CHAIN OF DERAILLEUR BICYCLE GEAR CHANGERS

This is a continuation, of application Ser. No. 539,852 filed Jan. 9, 1975 now abandoned.

The present invention concerns a device for guiding the chain of bicycle derailleur gear changers, said device including two pulleys, called the chain-guiding pulley and the chain-adjusting pulley, around which the chain passes and which are mounted between the extremities of two supporting cheeks connected together rigidly and mounted on a derailleur in such a way as to be able, on the one hand, to pivot about an axis parallel to that of the hub of the free back wheel of the bicycle and in a plane substantially perpendicular to said axis and, on the other hand, to move at right angles to the plane perpendicular to said axis, according to the position of a hand control lever, on a path which covers each of the various sprocket wheels in rigid connection with the said hub.

It often happens that, following an involuntary displacement of the hand control lever, for instance during a period when the bicycle is out of use, the chain-guiding pulley is no longer in the plane defined by the sprocket wheel on the hub of the back wheel while the chain is still in engagement with the sprocket wheel. When the chain is displaced in the direction corresponding to forward movement of the bicycle, this lack of alignment has practically no serious consequences, since in this case the chain is automatically transferred on to the sprocket wheel corresponding to the new position of the chain-guiding pulley. On the other hand, when, starting from the position of non-alignment of the sprocket wheel engaged with the chain and the chain-guiding pulley, the upper part of the chain is displaced in the backward direction as a result of back-pedalling, this lack of alignment is extremely troublesome. In fact, in this case, the section of the chain included between the chain-adjusting pulley and the sprocket wheel leaves the chain-guiding pulley and jumps out of the supporting cheeks or wedges itself between one supporting cheek and either the chain-guiding pulley or some component of the gear changer. In this case, the tensile force applied to one of the edges of the chain then tends to establish alignment of the chain between the front chain wheel and the sprocket wheel capped by the chain, which leads to deformation of the gear changer and/or of the guiding device and which then renders the assembly of derailleur and guiding devices useless.

It also often happens that during back-pedalling in the position of non-alignment between the sprocket wheel engaged by the chain and the chain-guiding pulley the chain becomes situated between two sprocket wheels and then wedges itself between these two wheels during the movement following pedalling in the normal direction.

The invention has as its object of the elimination of the above-mentioned disadvantages and the provision of a device for guiding the chain for a bicycle derailleur gear changer which will eliminate any involuntary wedging or disengagement of the chain in the case of non-alignment between the sprocket wheel engaged by the chain and the chain-guiding pulley during back-pedalling.

Accordingly the invention provides a device for guiding the chain of a bicycle derailleur gear changer including two pulleys termed the chain-guiding pulley and the chain-adjusting pulley about which the chain passes and which are mounted between the extremities of two supporting cheeks attached rigidly to each other and mounted on a gear changer in such a way as to be able, on the one hand, to pivot about an axis parallel to that of the hub of the free back wheel of the bicycle and in planes substantially perpendicular to the said axis and, on the other hand, to move transversely with respect to the plane perpendicular to the axis of said hub, according to the position of a hand control lever, on a path which covers each of the various sprocket wheels attached rigidly to said hub, wherein, in the region of the chain-guiding pulley and over at least that part of the chain-guiding pulley which is normally in contact with said chain, the supporting cheeks are radially extended beyond the periphery of said chain-guiding pulley through a distance corresponding to at least the height of a link of the chain and the radial extensions of the cheeks terminate in edges turned over towards the extrior of the guiding device.

Owing to this arrangement, on the one hand, even if the chain leaves the chain-guiding pulley at the time of back-pedalling, it is guided, either by the radial extension or by the curved-over edge of one of the cheeks and remains in engagement with the original sprocket wheel or, on the other hand, the chain falls automatically back on to the chain-guiding pulley and changes sprocket wheel so as to place itself on the sprocket wheel corresponding to the position of the chain-guiding pulley as soon as a movement of the pedals in the normal direction begins.

The edges of the extensions of the cheeks are sufficiently broad to support the segment of chain included between a sprocket wheel and the non-aligned chain-adjusting pulley. The edge of the extension of the cheek which is located away from the back wheel of the bicycle, that is of the external cheek, has a breadth which, at least in the zone adjacent the chain-guiding pulley, is at least equal to the maximum breadth of the links of the chain. On the other hand, the edge of the extension of the cheek which is opposite to the back wheel of the bicycle, that is of the internal cheek, has a breadth less than the separation between two fish-plates of one link of the chain. In this manner one part of the segment of chain included between the sprocket wheels and the chain-adjusting pulley is always supported either by resting on the broad edge of the extension of the external cheek or by resting on the narrow edge of the extension of the internal cheek which engages with the chain beween the fish-plates of the link.

In order to give a jumping movement to the section of chain included between the chain-adjusting pulley and one of the sprocket wheels of the back wheel when it is resting on the curved-back edge of the extension of the external cheek, upstanding bosses are provided on said edge, such that the majority of their generating lines are substantially parallel to the axis of the chain-guiding pulley. The angular separation between the summits of the bosses is substantially equal to the distance between the axes of articulation of neighbouring links of the chain. This jumping movement also contributes to the prevention of any wedging of the chain either at the level of the derailleur or at the level of the sprocket wheels.

Given that the edge of the extension of the external cheek comes into operation mainly when the chain engages the sprocket wheels of the smallest diameters, that is the exterior sprocket wheels, it is advantageous that this edge should cover a sector starting at its rear extremity at least from a plane passing through the axes of the two pulleys and extending forwards in the clockwise direction in such a way that the angle included by the curved edge is at least of the order of 100°.

The curved edge may, at its rear extremity, extend downwards beyond the plane passing through the axes of the chain-guiding and the chain-adjusting pulleys, that is to say in the counter-clockwise direction, through about 45° in order to allow effective guiding of the chain when it is situated close to the sprocket wheels of very small diameter.

At the front extremity of the curved edge of the extension of the external cheek there is connected a rectilinear section of the edge which extends towards the chain-adjusting pulley and which is inclined towards that part of the chain-adjusting pulley which is in contact with the chain. This arrangement makes it possible to move the chain towards the space included between the two lateral cheeks and the two pulleys.

In order to allow the chain-guiding pulley to come as close as possible to one of the corresponding sprocket wheels of the back wheel of the bicycle, the internal cheek is cut short in comparison with the curved edge of the external cheek and terminates in a zone situated substantially perpendicular to the axis of the chain-guiding pulley and with respect to the plane passing through the axes of the chain-guiding and the chain-adjusting pulleys. It is also advantageous to mount the axle of the chain-guiding pulley on the external cheek only and to connect the two cheeks by a screw bolt and a spacing sleeve mounted between the two pulleys, preferably close to the chain-guiding pulley.

The narrow edge of the extension of the internal cheek on the side of the chain-guiding pulley has a curved contour which develops from the neighbourhood of the axle of the chain-guiding pulley in a spiral manner and extends beyond the curved edge and the rectilinear edge of the extension of the external cheek by at least the height of a link of the chain.

In the neighbourhood of the extreme part of the rectilinear edge of the internal cheek which is adjacent the farthest part on the chain-guiding pulley side, the curved part of the narrow edge joins a rectilinear part of the narrow edge, said rectilinear part being inclined towards that part of the chain-adjusting pulley which is in contact with the chain, the inclined parts of the rectilinear edges of the two cheeks becoming progressively narrower in the direction of the chain-adjusting pulley.

In order to give the chain greater freedom of passage and of deviation in the case of back-pedalling, the separation of the lateral cheeks is slightly greater adjacent the chain-adjusting pulley than adjacent the chain-guiding pulley.

It is also advantageous to provide on the chain-guiding pulley, on the side of the internal cheek, a coaxial circular supporting disc with a diameter slightly less than that of the chain-guiding pulley, which extends laterally through the whole breadth included between the chain-guiding pulley and the internal cheek and which is intended to promote the maintenance or repositioning of the chain on said pulley and to avoid any wedging of the chain between said pulley and the internal cheek.

An embodiment of the invention will now be described with reference to the accompanying drawing, in which:

FIG. 1 shows an exploded perspective view of a device for chain-guiding for a bicycle derailleur gear changer, FIG. 2 shows a side elevation of the guiding device, FIG. 3 shows a plan view of the guiding device, FIG. 4 shows a section along the line IV—IV of FIG. 2, FIG. 5 shows a section along the line V—V of FIG. 2, and FIGS. 6 and 7 show, in plan, the guiding device associated with the sprocket wheels of the back wheel of the bicycle for ensuring guidance of the chain in the case of back-pedalling.

Referring to the drawings a chain-guiding device for a bicycle derailleur gear changer 18, includes two supporting cheeks or cheek plates 1, 2 arranged in parallel, rigidly attached to each other, and carrying on their extremities a chain-guiding pulley 3 which is closer to the set of sprocket wheels 16a, 16b, 16c, 16d and 16e (FIGS. 6 and 7) mounted on the hub 19, 17 of the bicycle (not shown) than is the chain-adjusting pulley 4.

The supporting cheeks 1, 2 extend in planes parallel to that of the back wheel of the bicycle and can be displaced together at right angles to said plane so as to present the bicycle chain in front of one or other of the sprocket wheels of the back wheel. Since the system for the lateral displacement of the present guiding device does not form part of the present invention, it will not be described in more detail. We will only mention that said lateral displacement system may make use of either a telescopic rod or a deformable parallelogram the position of which is controlled by a hand lever, said displacement being transmitted to the rod or to the parallelogram by means of a cable in known manner.

In order to simplify the description, the cheek 1 at a distance from the back wheel of the bicycle will be called the external cheek, and the cheek 2 situated in the immediate neighbourhood of said wheel will be called the internal cheek.

The chain-guiding pulley 3, fitted, for example with teeth 3a, is mounted only on the external cheek 1 by means of an axle 5, which, in addition, may be extended towards the exterior beyond the external cheek in order to be connected to the lateral displacement system (not shown) of the gear changer.

It will be appreciated that the whole of the guiding device can pivot about the axle 5. The two supporting cheeks 1 and 2 are connected together, on the one hand, by the axle 6 which supports the chain-adjusting pulley 4 through a ball-bearing 7 and, on the other hand, by a threaded bolt 8 screwed by means of its threaded section into a bore on the cheek 2 and located through a spacing sleeve 9 arranged between the two cheeks 1 and 2 close to the chain-guiding pulley and between the latter and the chain-adjusting pulley 4.

The bicycle chain 10, seen in plan in FIGS. 6 and 7, passes over the chain-guiding pulley 3 and under the chain adjusting or tensioning pulley 4. The lengths of the arcs of contact between the chain and, on the one hand, the chain-guiding pulley 3 and, on the other hand, the chain-adjusting pulley 4 depend on the inclination of the plane passing through the axles 5, 6, said inclination itself depending on the position of the pulleys 3, 4 in relation to the sprocket wheels of the back wheel of the bicycle.

According to the invention the cheeks 1, 2 are radially extended beyond the periphery of the chain-guiding pulley 3 at the level of said chain-guiding pulley 3 and at least on that part of the sector which is defined by the part of the contour of the chain-guiding pulley which is in contact with the chain during normal operation of the gear changer. For the external cheek 1 this radial extension 1a is equal to at least the height of one link of the chain and for the external cheek 2 the radial extension 2a, within the zone included between the axles 5, 6 of the pulleys 3, 4, is equal to at least twice the height of one link of the chain. The extensions of the cheeks 1a, 2a terminate in edges 1b, 2b curved over towards the exterior (with respect to the space included between the two cheeks 1, 2).

The edge 1b of the external cheek 1, in the zone of the chain-guiding pulley 3 has a breadth at least equal to the maximum breadth of the links of the chain. On the other hand, the breadth of the curved-over edge 2b of the internal cheek 2 is less than the free breadth, that is the separation of the fish-plates, of one link of the chain. In the zone of the chain-guiding pulley 3, the curved-over edge 1a has a curved contour which is substantially circular and concentric with respect to the axle 5 of the chain-guiding pulley 1.

On the section with curved contour 1b, the curved-over edge 1a includes upstanding bosses 1c the majority of the generating lines of which are substantially parallel to the axle 5 of the chain-guiding pulley 3, as are the generating lines of the curved-back edge 1a. The angular separation of the summits 1c' of the bosses 1c is substantially equal to the distance between the axes of the articulations of neighbouring links. As can be seen in FIG. 2, in particular, the curved contour of the curved-back edge 1a covers a segment which, starting from a point 11 situated on said edge 1a, in the plane 12 passing through the axles 5, 6, beyond the zone included between these two axles 5, 6, and moving in the clockwise direction, includes an angle α which is at least of the order of 100°. It is possible to extend the curved contour of the curved-back edge 1a starting from the point 11, which may constitute the rear extremity of said edge, in the anticlockwise direction in such a way that the sector covered by said edge below the plane 12 includes an angle β of the order of 45°. It will be noted that the sector defined by the angle β is free from bosses 1c which are provided only on the sector including the angle α.

The forward extremity 14 of the curved contour of the curved-back edge 1a joins a rectilinear part 1e of the curved-back edge which extends towards the chain-adjusting pulley 4 and which is inclined towards that part of the chain-adjusting pulley which is in contact with the chain 10. In addition, the rectilinear part 1e of the edge becomes progressively narrower from the chain-guiding pulley 3 towards the chain-adjusting pulley 4.

As can be seen, in particular in FIGS. 2 and 3, on the side of the sprocket wheels, that is at the level of the chain-guiding pulley, the internal cheek 2 is staggered, that is it is shortened with respect to the curved edge 1a of the external cheek 1, in such a way that the ege 2a, also with a curved contour, of the internal cheek 2 terminates in a zone which, with respect to the axles 5, 6, is situated substantially at a right angle to the line of the axis of the axle 5. In addition, the extremity of the cheek 2 does not serve to support the axle 5 of the chain-guiding pulley. These arrangements allow the chain-guiding pulley 3 to be held very close to the sprocket wheel with which it is aligned without the internal cheek 2 striking against the neighbouring sprocket wheel of larger diameter.

The curved contour 2b of the narrow edge 2a, starting from the neighbourhood of the axle 5, develops as a spiral and extends in the radial direction beyond the curved contour of the curved-back edge 1a in the zone of its forward extremity 14 a distance of the order of the height of a link of the chain. The curved contour of the curved-back edge 2a of the internal cheek 2 joins, at the point 15, substantially perpendicular to the intersection between the periphery of the chain-guiding pulley 3 and the plane 12 between the two axles 5, 6, a rectilinear part 2c of the edge which is inclined and becomes progressively narrower in the direction towards that part of the chain-adjusting pulley which is in contact with the chain.

It will also be seen that the separation of the cheeks 1, 2 is slightly greater on the side of the chain-adjusting pulley 4 than on the side of the chain-guiding pulley 3, this difference in separation being of the order of one to several millimeters. A coaxial supporting disc 3b which has a diameter slightly less than that of the pulley 3 and which extends laterally over the whole breadth of the opposite faces of said pulley 3 and the internal cheek 2, will also be seen on the chain-guiding pulley 1.

In FIGS. 6 and 7, the mode of operation of the chain-guiding device is illustrated for the case of back-pedalling when the chain-guiding pulley 3 is out of alignment with the sprocket wheel in contact with the chain 10. FIG. 6 illustrates the case in which the chain-guiding 3 is aligned with third sprocket wheel 16c of an assembly of five sprocket wheels 16a, 16b, 16c, 16d, 16e of the back wheel 17 of the bicycle while the chain 10 engages with the smallest sprocket wheel 16a. In the case of pedalling in the normal direction, that is in the direction of forward movement of the bicycle, the chain 10 changes sprocket wheel automatically and places itself, in the present case, on the middle sprocket wheel 16c. But in the case of back-pedalling the chain 10 would jump or wedge itself if there were no device according to the invention. In fact, in this case, the chain 10 mounts partly on to the curved-over edge 1a of the external cheek, but is held and guided by the latter, which thus acts as an auxiliary pulley.

In FIG. 7, the chain-guiding pulley 3 is aligned with the sprocket wheel 16a while the chain 10 engages with the sprocket wheel 16d. When back-pedalling occurs, the chain 10 is guided by the edge 2a of the internal cheek, said edge thus acting as an auxiliary pulley.

What we claim as our invention and desire to secure by Letters Patent of the United States is:

1. In a device for guiding the link chain of a bicycle derailleur gear changer on a bicycle having a wheel including a hub, a plurality of sprocket wheels attached to said hub and an endless chain link drive chain having links formed of pairs of articulated fish plates, and a derailleur gear changer for moving the chain between said plurality of sprocket wheels attached to the hub of the bicycle wheel, the improvement comprising external and internal cheek plates rigidly secured to each other in slightly spaced relation to each other with the external cheek plate being spaced further from the bicycle wheel than the internal cheek plate, said cheek plates being pivotally mounted on said derailleur gear changer about an axis extending parallel to the axis of rotation of the sprocket wheels for pivotal movement in planes substantially perpendicular to said axes; said plates moving together with the derailleur gear changer transversely with respect to said planes of pivotal movement on a path which covers each of said plurality of sprocket wheels; a chain guide pulley and a separate chain tensioning pulley rotatably mounted between said cheek plates in spaced relation to each other adjacent opposite ends of the plates, said chain guide pulley being normally located above the tensioning pulley closer to said sprocket than the tensioning pulley, said link chain passing in contact with the pulleys generally diagonally from said tensioning pulley to said guiding pulley between said cheek plates, said cheek plates, at least in the region thereof adjacent the part of the chain guiding pulley which is normally contacted by the link chain during operation of the bicycle, having extension portions extending radially beyond the periphery of said chain guiding pulley through a distance corresponding to at least the height of a chain link, said radial extensions terminating in edges which are turned over in opposite directions extending away from the guiding pulley; the edges of the extensions of the cheek plates having a breadth sufficient to support a segment of chain extending between one of said sprocket wheels and said chain-tensioning pulley; said turned over edge of the radial extension of the external cheek plate having, at least in the zone adjacent the chain-guiding pulley, a breadth at least equal to the maximum breadth of the links of the chain.

2. A device according to claim 1, wherein the separation of the cheek plates is slightly greater adjacent the chain-tensioning pulley than adjacent the chain-guiding pulley.

3. A device according to claim 1, wherein the chain-guiding pulley has, on the side of the internal cheek plate, a coaxial circular supporting disc, with a diameter slightly less than that of the chain-guiding pulley, which extends laterally throughout substantially the whole space between the chain-guiding pulley and the internal cheek plate.

4. A device according to claim 1, wherein the turned over edge of the radial extension of the internal cheek plate has a breadth less than the separation between two fish-plates of one link of the chain.

5. A device according to claim 1, wherein the turned over edge of the external cheek plate is curved and includes upstanding bosses.

6. A device according to claim 5, wherein said bosses each have a summit and the angular separation of the summits of the bosses is substantially equal to the interaxial distance between the articulations of neighbouring links of the chain.

7. A device according to claim 1, wherein the turned over edge of the radial extension of the external cheek plate is curved and covers at least an angular sector starting at the plane passing through the axes of both the chain-guiding pulley and the chain-tensioning pulley and extending forward in the clockwise direction through an angle of the order of at least 100°.

8. A device according to claim 7, wherein the curved part of the turned over edge of the external cheek plate extends downwards beyond the plane passing through the axes of the chain-guiding pulley and the chain-tensioning pulley, in an anticlockwise direction, through about 45°.

9. A device according to claim 1, wherein the turned over edge of the radial extension of the external cheek plate includes a rectilinear part which extends towards the chain-tensioning pulley and extends towards that part of the chain-tensioning pulley which is in contact with the chain.

10. A device according to claim 1 whrein the internal cheek plate is of reduced size relative to the radial extension of the external cheek plate and terminates in a zone situated substantially perpendicular with respect to the axis of the chain-guiding pulley and with respect to the plane passing through the axes of the chain-guiding and the chain-tensioning pulleys.

11. A device according to claim 1, wherein the chain-guiding pulley is rotatably mounted only on the external cheek plate.

12. A device according to claim 1, wherein the two cheek plates are attached together by a screw bolt and a spacing sleeve mounted between the two pulleys in proximity to the chain-guiding pulleys.

13. A device according to claim 1, wherein the turned over edge of the radial extension of the internal cheek plate has, adjacent the chain-guiding pulley, a curved contour which develops as a apiral starting from the neighbourhood of the axle of the chain-guiding pulley and extending beyond the edge of the extension of the external cheek plate by at least the height of a link of the chain.

14. A device according to claim 13, wherein the curved part of the turned over edge of the internal lcheek plate joins a rectilinear part of the edge, said rectilinear part extending towarded that part of the chain-tensioning pulley which is in contact with the chain.

15. A device according to claim 14, wherein the turned over edge of the radial extension of the external cheek plate includes a rectilinear part which extends towards the chain-tensioning pulley and extends towards that part of the chain-tensioning pulley which is in contact with the chain.

16. A device according to claim 15, wherein the rectilinear part of the edges of the two cheek plates become progressively narrower in the direction towards the chain-tensioning pulley.

* * * * *